(12) United States Patent
Lim

(10) Patent No.: US 10,572,066 B2
(45) Date of Patent: Feb. 25, 2020

(54) SYSTEM AND METHOD FOR CALIBRATING TOUCH ERROR

(71) Applicant: NHN Entertainment Corporation, Seongnam-si (KR)

(72) Inventor: Chuljae Lim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 15/951,751

(22) Filed: Apr. 12, 2018

(65) Prior Publication Data
US 2018/0300014 A1     Oct. 18, 2018

(30) Foreign Application Priority Data

Apr. 13, 2017   (KR) .................. 10-2017-0047890

(51) Int. Cl.
| | | |
|---|---|---|
| *G06F 3/041* | (2006.01) | |
| *G06F 3/0488* | (2013.01) | |
| *G06F 3/044* | (2006.01) | |

(52) U.S. Cl.
CPC .......... *G06F 3/0418* (2013.01); *G06F 3/0412* (2013.01); *G06F 3/04886* (2013.01); *G06F 3/044* (2013.01)

(58) Field of Classification Search
CPC ...... G06F 3/0418; G06F 3/0412; G06F 3/044; G06F 3/04886
See application file for complete search history.

(56) References Cited

U.S. PATENT DOCUMENTS

| | | | |
|---|---|---|---|
| 8,570,283 B2 | 10/2013 | Homma et al. | |
| 9,081,489 B2 | 7/2015 | Seo | |
| 9,348,456 B2 | 5/2016 | Murase et al. | |
| 2010/0302212 A1* | 12/2010 | Weber ............... | G06F 3/0488 345/178 |
| 2013/0201151 A1* | 8/2013 | Takashima .......... | G06F 3/044 345/174 |

FOREIGN PATENT DOCUMENTS

| | | |
|---|---|---|
| JP | 1998-198481 | 7/1998 |
| JP | 2000-066817 | 3/2000 |

(Continued)

OTHER PUBLICATIONS

Office Action dated Mar. 19, 2019 issued in Japanese Patent Application No. 2018-077801.

*Primary Examiner* — Charles V Hicks
(74) *Attorney, Agent, or Firm* — H.C. Park & Associates, PLC

(57) ABSTRACT

A system for calibrating touch error in a touch interface includes an object recognizing unit to recognize at least one object input through a touch interface from a plurality of objects on a touch keyboard; a target object determining unit to determine whether the recognized object corresponds to a target object that a user intended to input; a storing control unit to match and store location information corresponding to the recognized object and at least one location information corresponding to the target object; and a calibrating unit to calibrate the recognized object input through the touch interface to the target object based on the matched and stored location information. Methods for calibrating touch error are also disclosed.

20 Claims, 10 Drawing Sheets

(56) References Cited

FOREIGN PATENT DOCUMENTS

| | | |
|---|---|---|
| JP | 2010-140321 | 6/2010 |
| JP | 2012-247889 | 12/2012 |
| JP | 2014-007439 | 1/2014 |
| KR | 10-2008-0029028 | 4/2008 |
| KR | 10-2011-0049589 | 5/2011 |
| KR | 10-2012-0046057 | 5/2012 |
| KR | 10-1452191 | 10/2014 |

* cited by examiner

SYSTEM AND METHOD FOR CALIBRATING TOUCH ERROR

CROSS REFERENCE TO RELATED APPLICATION

This application claims priority from and the benefit of Korean Patent Application No. 10-2017-0047890, filed on Apr. 13, 2017, which is hereby incorporated by reference for all purposes as if fully set forth herein.

BACKGROUND

Field

Exemplary implementations of the invention relate generally to touch inputs on displays, and more particularly, to systems and method for calibrating touch errors created when an object different from the object intended by a user is recognized due to an input error such as may be caused by the finger size or shape of a user when inputting a string of characters on a touch keyboard.

Discussion of the Background

Recently it is possible to perform various functions provided in existing desktop PCs such as internet chatting, email transmitting and receiving, document writing, and the like in easy to carry small-sized electronic device such as smart phone, tablets, and the like. In the case of portable electronic devices such as smart phone and tablet, because the device has to be easy to carry and have small size, people prefer to use a virtual touch keyboard on a display screen as an input/output device for performing various functions rather than using separately input/output devices such as physical keyboard or mouse.

When using a touch keyboard, because the size of a user's finger, point of fingertip, edge where the finger pushes, and the like are different for each of the users, sometimes letters recognized in the input system by the user's touch are different from the letters that the user intended to touch. Also, depending on whether the user is right-handed or left-handed, it often letters intended by a user and letters recognized in a system are different, i.e., the user's pointing is wrong.

Likewise, because the user pointed to the wrong letter, the user keeps trying to touch until an object intended by the users is recognized in a system. This frustrates the users and decreases the user's experience. Decrease in the user's experience causes dissatisfaction and users feel it is inconvenient or undesirable to use corresponding device.

Eventually, the users may reject and change the corresponding device, e.g., in favor of a larger display screen or a physical keyboard. Accordingly, technologies have developed for confirming error (i.e., touch error) and calibrating automatically the error in a system even though the pointing is wrong. For example, Korean Patent Publication No. 10-2008-0029028, which relates to a method for inputting characters in terminal having touch screen, discloses reducing input error according to touch error generated in the process of enlarging and displaying surrounding area around a specific key and selecting the specific key when a touch device approaches to the specific key of a virtual keyboard.

The above information disclosed in this Background section is only for understanding of the background of the inventive concepts, and, therefore, it may contain information that does not constitute prior art.

SUMMARY

Systems and methods for calibrating touch error constructed according to the exemplary implementations of the invention are capable of confirming an error (e.g., touch error) and automatically calibrating the error in a system when an erroneous object has been touched.

Systems and methods for calibrating touch error constructed according to the exemplary implementations of the invention are capable of automatically calibrating touch recognition error to identify an erroneous object (e.g., an object adjacent to a target object) different from the object that a user intended to input when a touch input for selecting an object is generated by using a touch keyboard.

Systems and methods for calibrating touch error constructed according to the exemplary implementations of the invention are capable of collecting information relating to touching different locations (i.e., points) relative to the same specific object (letter, number, mark, and the like) according to shape and size of the finger of a user, and performing optimized calibration for each of the users through a learning process based on the collected information.

Systems and methods for calibrating touch error constructed according to the exemplary embodiments of the invention are capable of improving touch sensitivity by calibrating touch error more precisely by dividing each of sections of a touch keyboard into right-handed touch, left-handed touch, and/or other sections (e.g., center section, edge section, and the like).

Additional features of the inventive concepts will be set forth in the description which follows, and in part will be apparent from the description, or may be learned by practice of the inventive concepts.

According to one aspect of the invention, a system for calibrating touch error in a touch interface includes an object recognizing unit to recognize at least one object input through a touch interface from a plurality of objects on a touch keyboard; a target object determining unit to determine whether the recognized object corresponds to a target object that a user intended to input; a storing control unit to match and store location information corresponding to the recognized object and at least one location information corresponding to the target object; and a calibrating unit to calibrate the recognized object input through the touch interface to the target object based on the matched and stored location information.

The target object determining unit may determine that the recognized object does not correspond to the target object when the recognized object is deleted within predetermined time period and an adjacent object is input instead of the deleted object, and may determine the adjacent object is the target object.

The target object determining unit may determine that the recognized object corresponds to the target object when the recognized object is not changed for a predetermined time period.

The calibrating unit may calculate a distance between location information corresponding to the adjacent object and location information corresponding to the deleted object, and may calibrate the recognized object to the target object based on the calculated distance.

The calibrating unit may correct to move location information corresponding to the new object based on the matched and stored location information when the new object does not correspond to the target object that a user intended to input.

The storing control unit may control location information corresponding to the adjacent object input after the recognized object is deleted and location information corresponding to the recognized object to be matched and stored, when the recognized object does not correspond to the target object that a user intended to input.

The object recognizing unit may determine touch direction corresponding to the recognized object input through the touch interface from right-handed touch and left-handed touch based on a specific voltage value corresponding to the recognized object.

The storing control unit may control location information corresponding to the recognized object and at least one location information corresponding to the target object to be matched and stored by dividing a touch keyboard according to the determined touch direction.

The calibrating unit may divide the plurality of objects placed on the touch keyboard by sections according to location on the touch keyboard, may generate correcting information for each of the sections based on the matched and stored location information, and may calibrate the recognized object to the target object based on correcting information corresponding to a section in which the recognized object is included.

According to another aspect of the invention, a method of calibrating touch error in a touch interface includes the steps of: recognizing at least one object input through a touch interface for a plurality of objects on a virtual touch keyboard; determining whether the recognized object corresponds to a target object that a user intended to input; matching and storing location information corresponding to the recognized object and at least one location information corresponding to the target object; and calibrating the recognized object input through the touch interface to the target object based on the matched and stored location information.

The step of determining whether the recognized object corresponds to a target object that a user intended to input may include determining that the recognized object does not correspond to the target object when the recognized object is deleted within predetermined time period and an adjacent object is input instead of the deleted object; and determining the adjacent object is the target object.

The step of determining whether the recognized object corresponds to a target object that a user intended to input may further include determining that the recognized object corresponds to the target object when the recognized object is not changed for predetermined time period.

The step of calibrating the recognized object to the target object may include calculating a distance between location information corresponding to the adjacent object and location information corresponding to the deleted object; and calibrating the recognized object to the target object based on the calculated distance.

The step of calibrating the recognized object to the target object may include correcting to move location information corresponding to the new object based on the matched and stored location information when the new object does not correspond to the target object that a user intended to input.

The step of calibrating the recognized object to the target object may further include connecting and storing location information connects and stores location information corresponding to the adjacent object input after the recognized object is deleted and location information corresponding to the recognized object when the recognized object does not correspond to the target object that a user intended to input.

The step of recognizing at least one object may include determining touch direction corresponding to the recognized object input through the touch interface from right-handed touch and left-handed touch based on a specific voltage value corresponding to the recognized object.

The step of recognizing at least one object may further include matching and storing location information matches and stores location information corresponding to the recognized object and at least one location information corresponding to the target object by dividing the touch keyboard according to the determined touch direction.

The step of calibrating the recognized object to the target object may include dividing the plurality of objects into sections according to their location on the touch keyboard; generating correcting information for at least some of the sections based on the matched and stored location information; and calibrating the recognized object to the target object based on the correcting information corresponding to a section in which the recognized object is included.

According to still another aspect of the invention, a computer program stored in a recording medium to execute a method for calibrating touch error combined with an electronic device implemented by a computer includes recognizing at least one object input through a touch interface for a plurality of objects placed on a virtual touch keyboard configured with two-dimensional array, determining whether the recognized object corresponds to a target object that a user intended to input, connecting and storing location information corresponding to the recognized object and at least one location information corresponding to the target object, and calibrating a the recognized object input through the touch interface to the target object based on the connected and stored location information.

The step of determining whether the recognized object corresponds to a target object that a user intended to input may include determining that the recognized object does not correspond to the target object when the recognized object is deleted within predetermined time and an adjacent object is input instead of the deleted object; and determining the adjacent object as the target object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
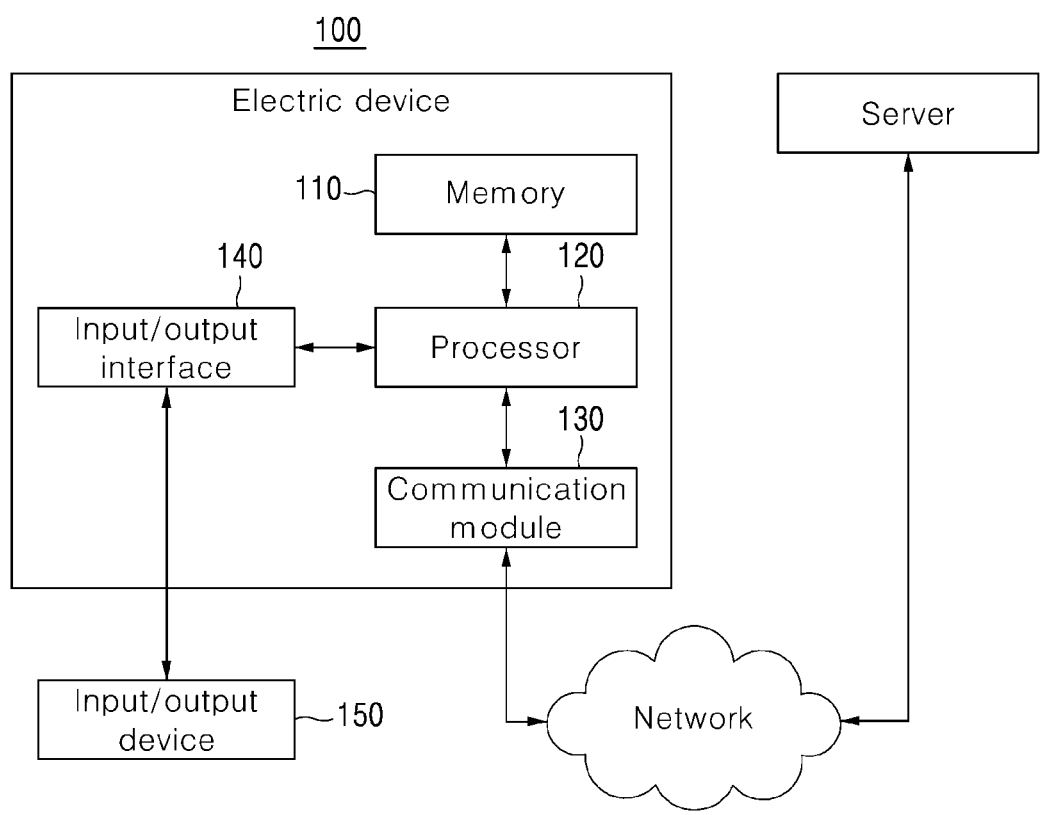
FIG. 1 is a schematic diagram of system for calibrating touch error constructed according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, processor, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, processor, and/or one or more components thereof may include or otherwise be associated with one or more memories (not shown) including code (e.g., instructions) configured to cause processor, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The exemplary embodiments of the invention relate to a technology for calibrating touch error of a selected object, and particularly, a technology for automatically calibrating touch error in a system when an object recognized in the system through a user's touch is different from a target object that a user intended to input. For example, after a user selects a specific object on a virtual keyboard where objects are placed in two-dimensional array, when the specific object is deleted within a certain time, the corresponding object is determined to be a erroneously touched object that is different from an object intended by the user, and information relating to the erroneously touched object is collected and analysis performed based on the collected information so that the system learns the error. And then, when the erroneously touched location is input again, the system may automatically calibrating the object corresponding to the erroneously touched location to the object intended by the user based upon the learning by the system.

In the exemplary embodiments of the invention, 'touch keyboard' is a virtual keyboard with two-dimensional array displayed on a screen of an electronic device, and objects (e.g., characters) such as letters, numbers, marks, and the like which are included in a physical keyboard may be placed on the touch keyboard with two-dimensional array.

In the exemplary embodiments of the invention, 'target object' may indicate an object (e.g., character) that a user intended to input from the plurality of objects placed on the touch keyboard. Also, 'adjacent object' may indicate objects neighboring an object that a user intended to input from the plurality of objects placed on the touch keyboard with two-dimensional array, i.e., objects neighboring the target object within a predefined range. For example, when a user tries to push 'q', 'the target object' may indicate 'q', and 'the adjacent objects' may indicate 'w', 'a', and the like which are objects neighboring 'q'.

In the exemplary embodiments of the invention, 'display of electronic device' may be attached with Indium-Tin-Oxide (ITO) transparent electrode film on the surface for sensing whether objects placed on the virtual touch keyboard displayed on a screen of an electronic device are touched and selected.

FIG. 1 is a schematic diagram of system for calibrating touch error constructed according to an exemplary embodiment of the invention.

Referring to FIG. 1, an electronic device 100 may be a fixed terminal implemented by a computer or a portable terminal, and includes a system for calibrating touch error. Examples of electronic device 100 include a smart phone, a mobile phone, a navigation or global positioning sysytem (GPS) system, a computer, a laptop, a digital broadcasting terminal, a PDA (Personal Digital Assistants), a PMP (Portable Multimedia Player), a tablet PC, and the like. For example, the electronic device 100 may communicate with a server or another electronic device through a network by using wireless or wired communication method.

According to FIG. 1, a system for calibrating touch error 100, which is an electronic device, may include a memory 110, a processor 120, a communication module 130, and an input/output interface 140. The memory 110 which is computer readable recording medium may include a permanent mass storage device such as RAM (random access memory), ROM (read only memory), and a disc drive. Also, the memory 110 may store OS (Operating System) and at least one program code (e.g., a code for browser, keyboard application installed and driven in the system for calibrating touch error 100). The software components may be loaded from other computer-readable recording medium separate from the memory 110 by using a drive mechanism. The other computer-readable recording medium may include a floppy disc, a disc, a tape, a DVD/CD-ROM drive, a memory card, and the like. In other exemplary embodiments, the software components may be loaded to the memory 110 through the communication module 130, instead of the computer-readable recording medium. For example, at least one program may be loaded to the memory based on a program (e.g., the application) which is installed by files that developers or file distributing systems distributing application installation files (e.g., the server) provide through the network.

The processor 120 may be configured to process instructions of computer program by performing basic arithmetic, logic, and input/output operation. The instructions may be provided to the processor 120 by the memory 110 or the communication module 130. For example, the processor 120 may be configured to execute the instructions received in accordance with program code stored in the recording device such as the memory 110.

The communication module 130 may provide a function for communicating the system for calibrating touch error 100 and the server through the network or provide a function for communicating with other electronic devices. For example, a request (e.g., a request for service such as letters, chatting, keyword search, etc., provided based on an object input through the virtual touch keyboard) that the processor 120 of the system 100 generates according to program code stored in recording device, such as the memory 110, may be transmitted to the server through the network according to the control of the communication module 130.

The input/output interface 140 may be a means for interfacing with an input/output device 150. For example, an input device may include a keyboard or a mouse, etc. and an output device may include a device such as a display for displaying a communication session of an application. As another exemplary embodiment, the input/output interface 140 may be a means for interfacing with a device in which an input function and an output function are integrated into a single function such as a touch screen, and the input/output interface 140 may be expressed as a touch interface. As more specific example, when processing instructions of the computer program loaded to the memory 110, the processor 120 may control a service screen or content configured by using data provided by the server to be displayed on the display through input/output interface 140.

Also, in other exemplary embodiments, the system for calibrating touch error 100 may include more components than the components of FIG. 1. However, there is no need to illustrate prior art components. For example, the system for calibrating touch error system 100 may include at least part of the described input/output device 150 or further include other components such as a transceiver, a GPS (Global Positioning System) module, a camera, various sensors, a database, and the like. As a more specific example, when the system for calibrating touch error 100 is a smart phone, various known components such as acceleration sensor or gyro sensor, camera, various physical buttons, button using touch panel, input/output port, vibrator for vibrating, and the like that the smart phone usually includes may be further included in the system for calibrating touch error 100.

According to exemplary embodiments of the invention, the system for calibrating touch error may be implemented in a device in which an application is executed. In other words, according to exemplary embodiments of the invention, the method for calibrating touch error may be executed in all devices in which an application may be installed and driven. Hereinafter, for convenience of description, the method will be described in an exemplary embodiment in which software (e.g., package file) for installing and driving an application is stored in the system for calibrating touch error 100, which is an electronic device, and the method for calibrating touch error, which is executed in the system for calibrating touch error 100.

In the exemplary embodiments of the invention, although a method for calibrating touch error for touch keyboard based on the Korean language is described as an example, various languages such as English, Chinese character, Arabic, and the like besides Korean may be used.

Figure 2:
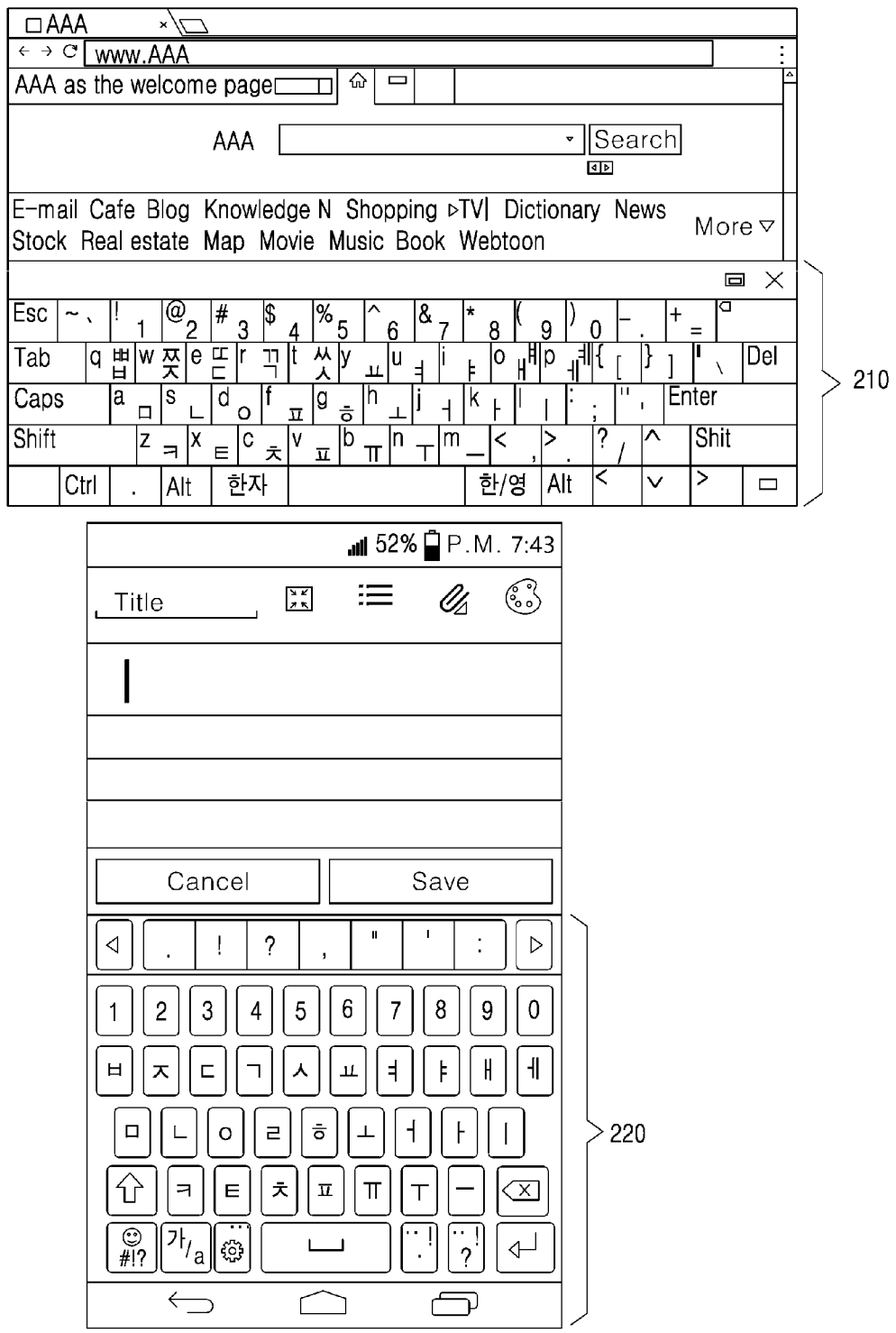
FIG. 2 is an example of virtual touch keyboard according to an exemplary embodiment of the invention.

FIG. 2 is an example of virtual touch keyboard according to an exemplary embodiment of the invention.

Referring to FIG. 2, a virtual touch keyboard may be provided in various forms according to the type of electronic device in which it is used.

For example, when the electronic device is a tablet, a virtual touch keyboard 210 may be provided in a form similar to that in which objects are placed on a physical keyboard in two-dimensional array. For example, letters, numbers, marks, arrow keys, ESC key, capslock key, ctrl key, alt key, enter key, del key, tap key, and the like may be placed on the virtual touch keyboard 210 in a two-dimensional array.

As another example, when the electronic device is a smart phone, a virtual touch keyboard 220 may use objects indicating keys, except keys which are not usually used in a smart phone and the like, in two-dimensional array from keys indicating objects placed on a physical keyboard. For example, keys indicating letters, numbers, marks, space, back space, and the like may be placed on the virtual touch keyboard 220. In other words, keys having low utilization in a smart phone, such as ESC key, capslock key, ctrl key, alt key, and tap key may be excluded on the virtual touch keyboard 220 that is displayed on a screen of an electronic device.

Figure 3:
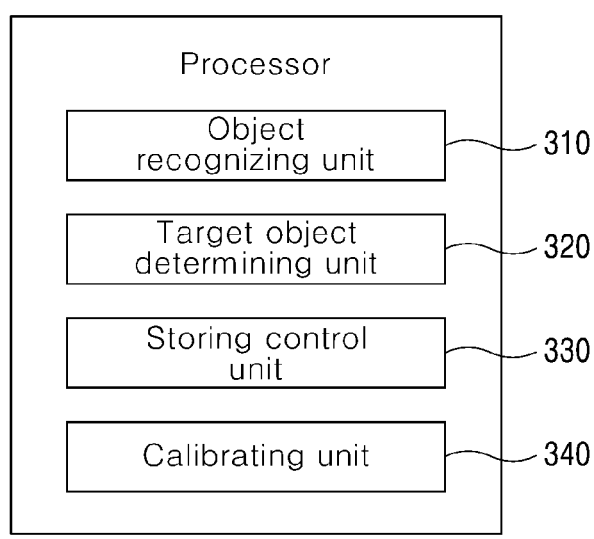
FIG. 3 is a block diagram of the processor shown in FIG. 1.
Figure 4:
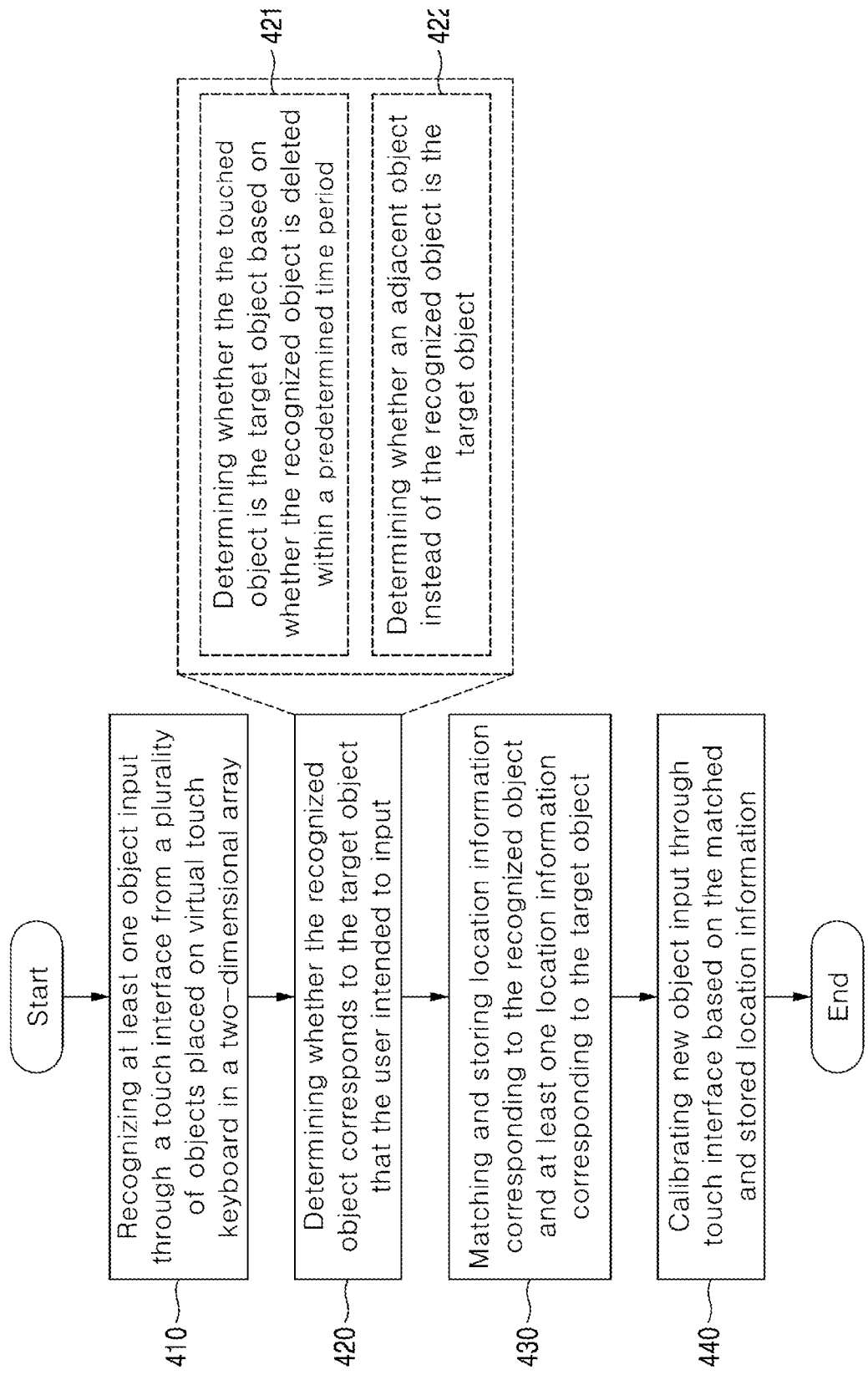
FIG. 4 is a flow chart for illustrating an example of method for calibrating touch error according to an exemplary of embodiment of the invention.

FIG. 3 is a block diagram of the processor shown in FIG. 1, and FIG. 4 is a flow chart for illustrating an example of method for calibrating touch error according to an exemplary of embodiment of the invention.

As described in FIG. 3, the processor 120 included in the system for calibrating touch error 100 may include software modules in the form of an object recognizing unit 310, a target object determining unit 320, a storing control unit 330, and a calibrating unit 340 as components. Also, the target object determining unit 320, the storing control unit 330, and the calibrating unit 340 may be used to perform each of operations 410 to 440 of FIG. 4.

In operation 410, the object recognizing unit 310 may recognize at least one object input through a touch interface (i.e., input/output interface) from a plurality of objects placed on a virtual touch key board in a two-dimensional array.

For example, the object recognizing unit 310 may recognize an object corresponding to a specific location based on location information of an object selected through an operation in which a user pushes or touches through his/her finger or a touch input device from a plurality of objects placed on a virtual touch keyboard configured in a two-dimensional array displayed on a screen of the system for calibrating touch error 100. Here, each of the plurality of objects placed on the virtual touch keyboard in a two-dimensional array may correspond to location information for the corresponding object, which is stored and maintained in a pre=existing database. When the selected location information matches the preexisting location information in the database, the touched object is recognized.

In operation 420, the target object determining unit 320 may determine whether the recognized object corresponds to a target object that the user intended to input. In other words, the target object determining unit 320 may determine whether an object that the user originally tries to push on the touch keyboard is recognized. For example, when an object that the user intended to input is 'q', it may determine whether the recognized object is 'q' or another object different from 'q' (for example, an object adjacent to 'q' on the touch keyboard such as 'w', 'a', 's', and the like).

In operation 421, the target object determining unit 320 may determine whether the recognized object is the target object or an erroneously touched object based on whether deletion (deletion by using del or backspace) of the recognized object occurred within a predetermined time period. Here, the erroneously touched object may indicate a case in which the location information for an object different from an object that a user intended to touch and recognize.

In operation 422, when the recognized object is determined not to be the target object that the user intended to input, the target object determining unit 320 may determine an adjacent object (i.e., neighboring object within predetermined range or distance from the recognized object) to be the recognized as the target object. When it is determined that the recognized object is the target object, the target object determining unit 320 does not substitute an adjacent object for the recognized object.

In operation 430, the storing control unit 330 may match location information corresponding to the recognized object and at least one location information corresponding to the target object and store the matched location information in a database.

For example, the storing control unit 330 may control location information of an object (i.e. the recognized object) corresponding to the touch location selected by the user through the touch interface to be stored in database. Here, when it is determined that the recognized object is not the target object and the adjacent object is to be input instead of the recognized object, the storing control unit 330 may control the location information of the adjacent object and the location information of the recognized object to be matched and stored in the database. Location information of an object recognized as the erroneous touch and location information of adjacent object (i.e., target object of the object recognized as wrong touch) may be matched, and stored several times repeatedly in the database whenever wrong touch recognition occurs. Then, the matched and stored location information may be used for touch input calibration for each of users by performing analysis using a learning algorithm, as is known in the art.

In operation 440, the calibrating unit 340 may calibrate a new object (i.e., the recognized object) input through the touch interface based on the connected and stored location information in database.

For example, when location information of the new object input and recognized through the touch interface corresponds to location information of an object other than the target object that the user intended to input (i.e., erroneously touched object) in operation 422, the calibrating unit 340 may calibrate the new object to the target object that the user intended to input based on the location information of the adjacent object (i.e., target object of the erroneously touched object) matched with location information of the erroneously touched object and previously stored. For example, when the recognized new object is 'w', 'w' was recognized because of the erroneous touch although 'q' was tried to be input before, and the location information was recognized as 'q' because the erroneous touch before corresponded to the location information of the recognized new object 'w', the calibrating unit 340 may automatically calibrate the new object 'w' to 'q'. In other words, the system may determine that the place corresponding to the location information included in 'w' is consistently touched when 'q' is tried to be pushed, e.g., because of size and thickness of finger, length of nail, or point of fingertip of the user, and the object recognized is different from input intention of the user because the erroneous touch is automatically calibrated to the object that the user intended to input. Then, although the user touches the location of an area adjacent to the area where the object that the user intended to input covers or touches by overlapping the covering area and the adjacent area, the system may automatically calibrate and display the object that the user actually intended to input.

Figure 5:
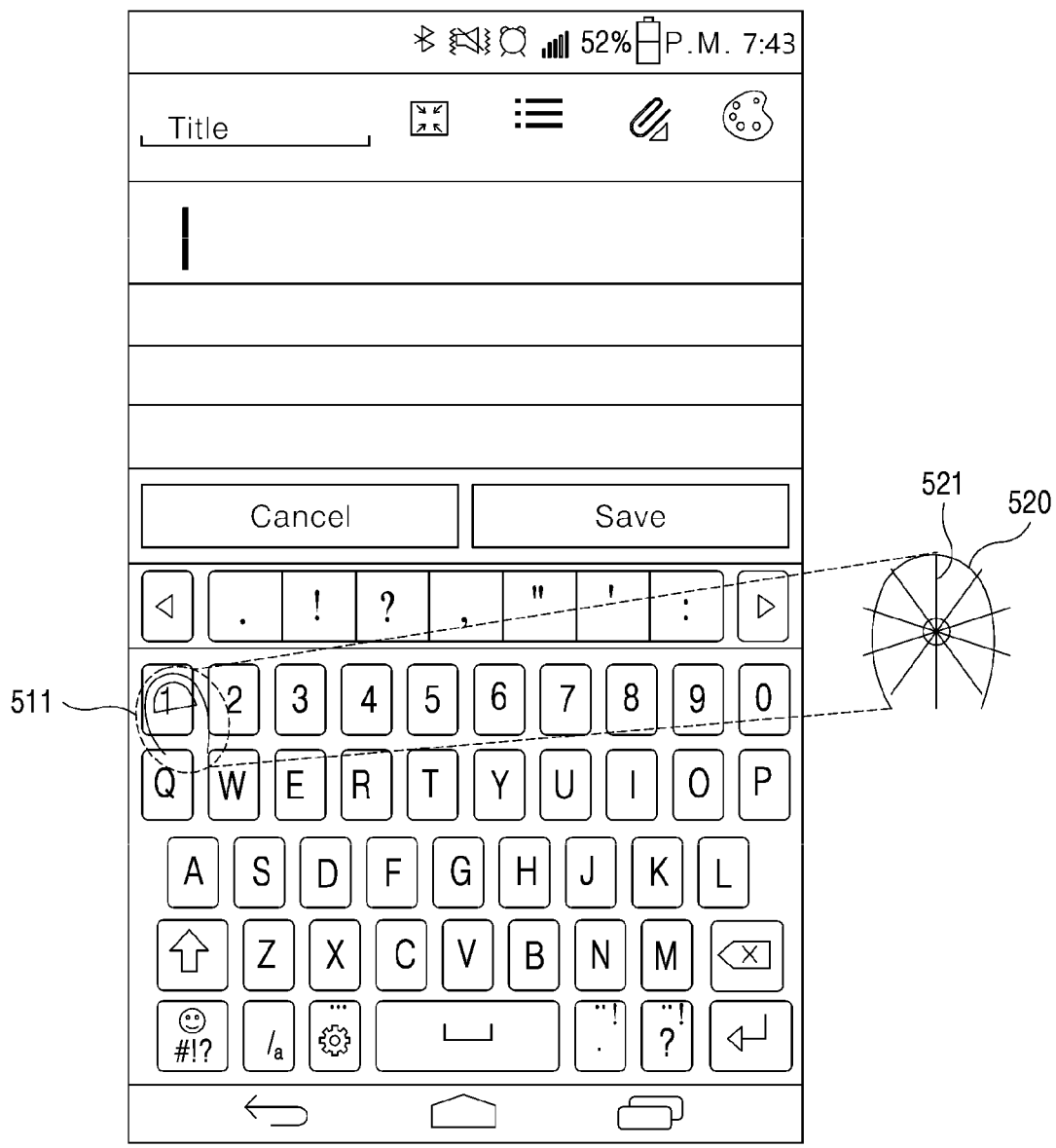
FIG. 5 is a diagram for describing an operation of recognizing an object selected through a virtual touch keyboard according to an exemplary of embodiment of the invention.
Figure 6A:
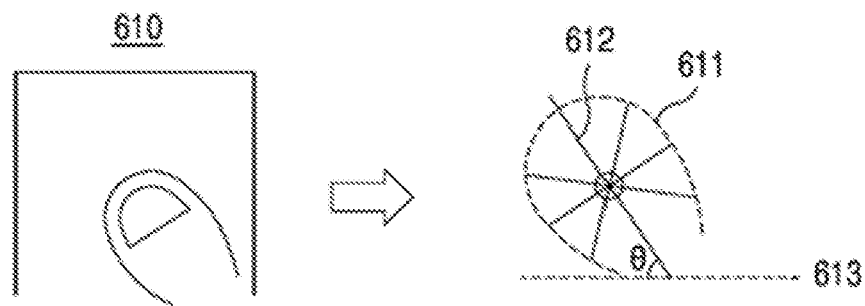
FIGS. 6A and 6B are diagrams for describing an operation of recognizing the touch direction of an object selected through virtual touch keyboard according to an exemplary of embodiment.
Figure 6B:
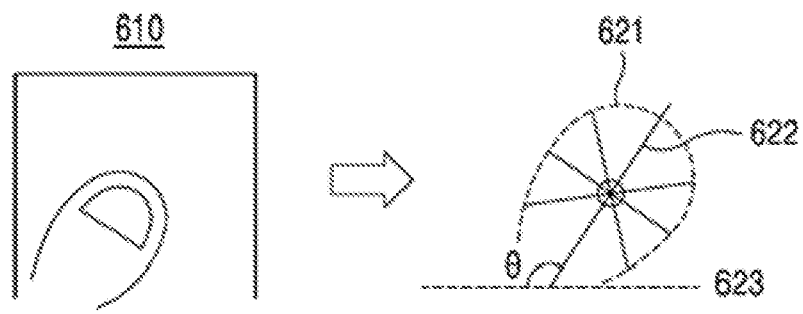

FIG. 5 is a diagram provided for describing an operation of recognizing an object selected through a virtual touch keyboard according to an exemplary of embodiment of the invention, and FIGS. 6A and 6B are diagrams for describing an operation of recognizing touch direction of an object selected through virtual touch keyboard according to an exemplary of embodiment.

Referring to FIG. 5, the system for calibrating touch error may include a transparent electrode film to recognize touch on a screen caused by using a user's finger or touch device.

The object recognizing unit 310 may sense a change of capacitance at specific location 511 (e.g., location corresponding to a specific object displayed on a screen) through the transparent electrode film attached to a screen 510. Also, the object recognizing unit 310 may calculate a 'center of gravity' (or 'center of mass') value of the touched area based on the sensed change of capacitance (i.e., constant voltage). For example, when the specific location 511 is touched to select 'q' on the screen 510, a specific voltage value corresponding to touched area may occur due to the touch. Then, the object recognizing unit 310 may calculate the center of gravity value in a virtual touch area 520 corresponding to the sensed the voltage value and recognize an object corresponding to the touched point by determining an object matched with location 521 corresponding to the calculated center of gravity value. In other words, the object recognizing unit 310 may recognize an object input through the touch interface by determining an object matched with the location corresponding to the calculated center of gravity value from the plurality of objects placed on the touch keyboard in a two-dimensional array. Likewise, each of the plurality of objects placed in the two-dimensional array on the virtual touch keyboard for recognizing the touched object may match location information that corresponding objects cover, and the matched location information may be stored and maintained in a database in advance.

In addition, the object recognizing unit 310 may recognize the direct of the touch ("touch direction") based on the shape of the touch area indicating a change of capacitance that occurred due to the touch.

Referring to FIGS. 6A and 6B, when a touch occurs for any one object from the plurality of objects placed on the touch keyboard, the object recognizing unit 310 may generate virtual touch areas 611, 621 based on the change of capacitance due to the touch. Then, the object recognizing unit 310 may recognize the touch direction indicating whether it is right-handed touch or left-handed touch based on the longest diameter, area, angle, grade, or the like in the touch areas 611, 621.

For example, the object recognizing unit 310 may recognize whether it is right-handed touch or left-handed touch based on angle θ between straight lines 612, 622 corresponding to the longest diameter in the touch area 612, 621 and predefined baselines 613, 623. For example, when the angle θ is an acute angle, it is determined as a right-handed touch, and when angle θ is an obtuse angle, it is determined as a left-handed touch.

As another example, when the left area is bigger with respect to the straight lines 612, 622 corresponding to the longest diameter in the touch areas 611, 621, the object recognizing unit 310 may recognize the touch direction as left-handed (i.e., finger touched and input is left-handed finger). Also, when right area is bigger with respect to the straight lines 612, 622 corresponding to the longest diameter in the touch areas 611, 621, the object recognizing unit 310 may recognize the touch direction as right-handed (i.e., finger touched and input is right-handed finger).

Then, information indicating the recognized touch direction may be matched with location information of the recognized object and stored in the matched location information in database. For example, when the recognized object is an erroneously touched object, touch direction information (e.g., information indicating whether it is left-handed finger touch or right-handed finger touch) may be matched with location information of the erroneously touched object and the location information of adjacent object (i.e., target object) input instead of the erroneously touched object, and stored in the matched location information.

Figure 7:
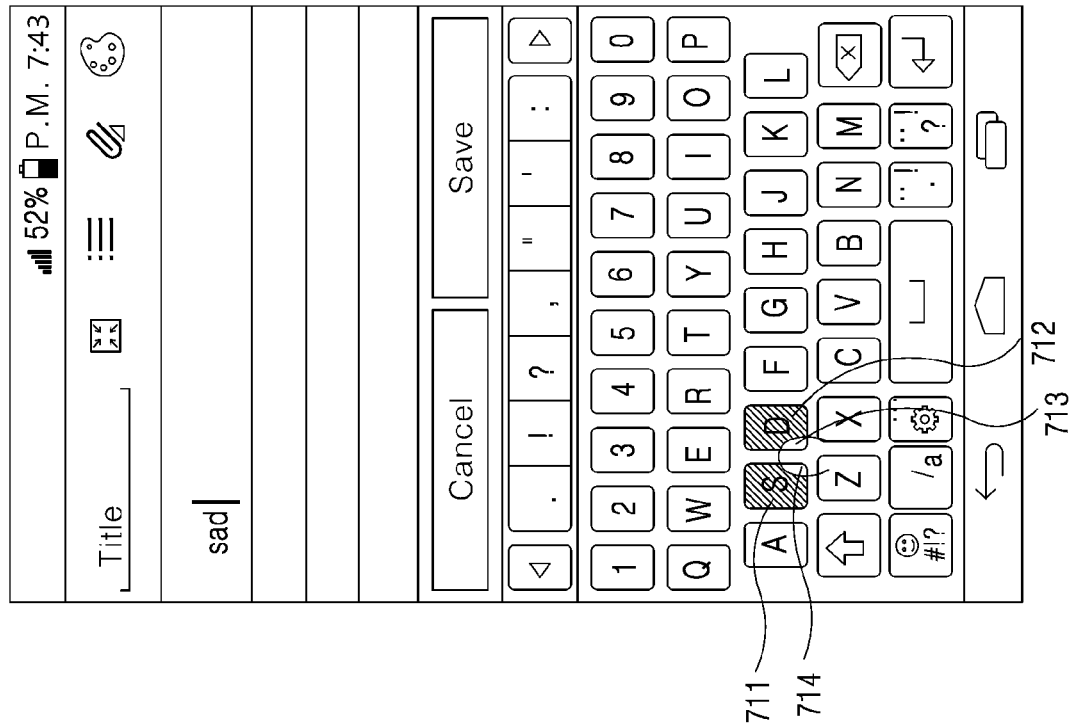
FIG. 7 is a diagram for describing an operation of determining whether a recognized object is a target object that user intended to input or according to an exemplary of embodiment.

FIG. 7 is a diagram for describing an operation of determining whether a recognized object is a target object that user intended to input or not according to an exemplary of embodiment.

In FIG. 7, it is supposed that a user tries to input 'dad'.

Referring to FIG. 7, although it is intended to first input 'd' to input 'dad', the screen may be touched at the left bottom area 713, which is part of the whole area 712 where 'd' covers along with right bottom area 714, which is part of whole area 711 where 's' covers. Here, when the touched location, which is calculated based on the voltage value caused by the touch and center of gravity method, corresponds to at least one location information included in the whole area 711 where 's' covers, it may be recognized as 's'. Then, the storing control unit 330 may control location information (e.g., location information calculated based on the center of gravity method) of the recognized object 's' to be stored in database. Also, the storing control unit 330 may control location information of 'a' and 'd' which are consecutively input after inputting the 's', and recognized to be stored in database. Here, the recognized 'sad' may be displayed in a screen 710.

Then, the erroneously recognized object may be deleted by recognizing that an object different from an object that the user intended is input and selecting an object corresponding to deletion (e.g., virtual touch key corresponding to backspace, del). Here, the target object determining unit 320 may determine that which object is the erroneously touched object from three recognized objects by confirming whether and/or how many deletions occurred for the recognized 's', 'a', and 'd'. For example, when three deletions are performed and which is an object adjacent to 's' is input instead of the first 's', the target object determining unit 320 may determine that the first 's' is erroneously touched object, not the target object from the three recognized objects. Likewise, the target object determining unit 320 may confirm the deletion operation and whether an object input instead of the deleted object is an object adjacent to the deleted object. Then the screen 720 may confirm whether the objects 'a' and which are sequentially input after 'd', which is the adjacent object input instead of the deleted object are the same with the deleted object 's' and the objects 'a' and 'd' which are sequentially input. Thus, the system may determine whether the corresponding object is the erroneously touched object or the target object When the recognized 'd', 'a', and 'd' are maintained for a predetermined time without a deletion operation, the target object determining 320 may determine that the corresponding objects correspond to the target object that the user intended to input.

Similarly, in the screen 710, when deletion operation does not occur for the recognized objects 's', 'a', and 'd' and the recognized objects 's', 'a', and are maintained for a predetermined time, the target object determining unit 320 may determine that the corresponding objects correspond to the target object that the user intended to input.

Likewise, location information of the erroneously touched object and location information of the target object that the user originally intended to input relating to the erroneously touched object are matched and stored in the matched location information in database. Then, based on the stored location information, it may be confirmed whether the user usually touches right bottom, right top, left bottom, left top, or left/right center through learning s whenever the corresponding user touches objects on the touch keyboard. Based on the confirmed result, correcting information is generated, and after that, calibration may be performed automatically for new input objects.

Figure 8:
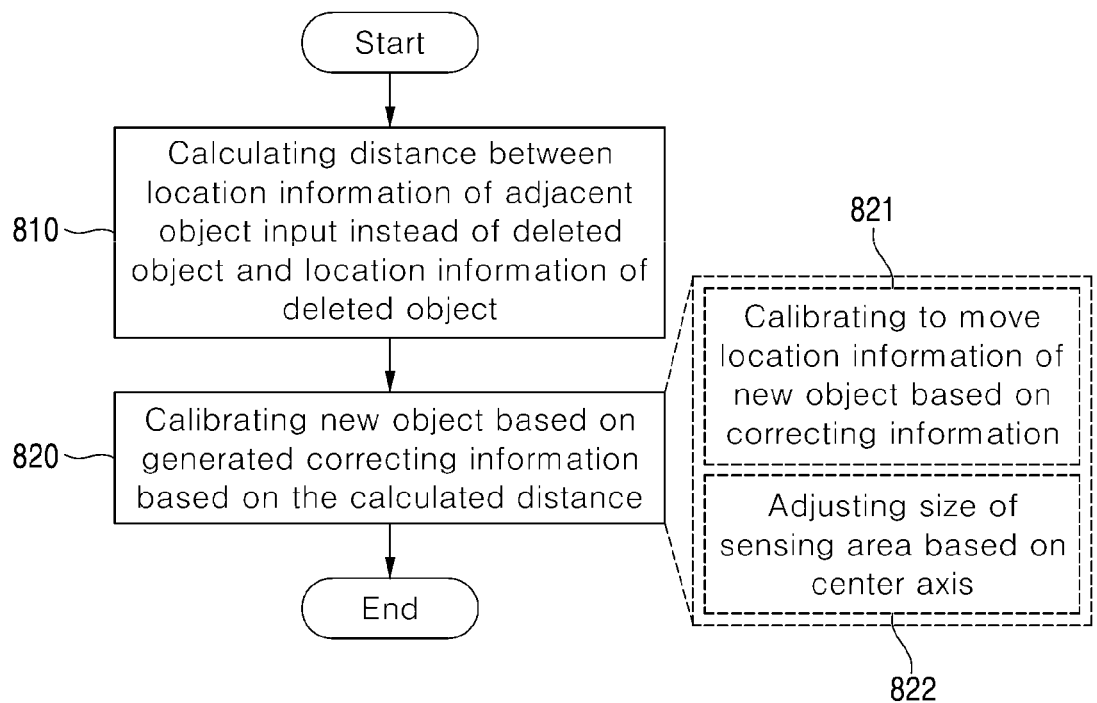
FIG. 8 is a flowchart for illustrating an operation of automatically calibrating a erroneously touched object to a target object that user intended to input based on correcting information generated through learning according to an exemplary of embodiment.
Figure 9:
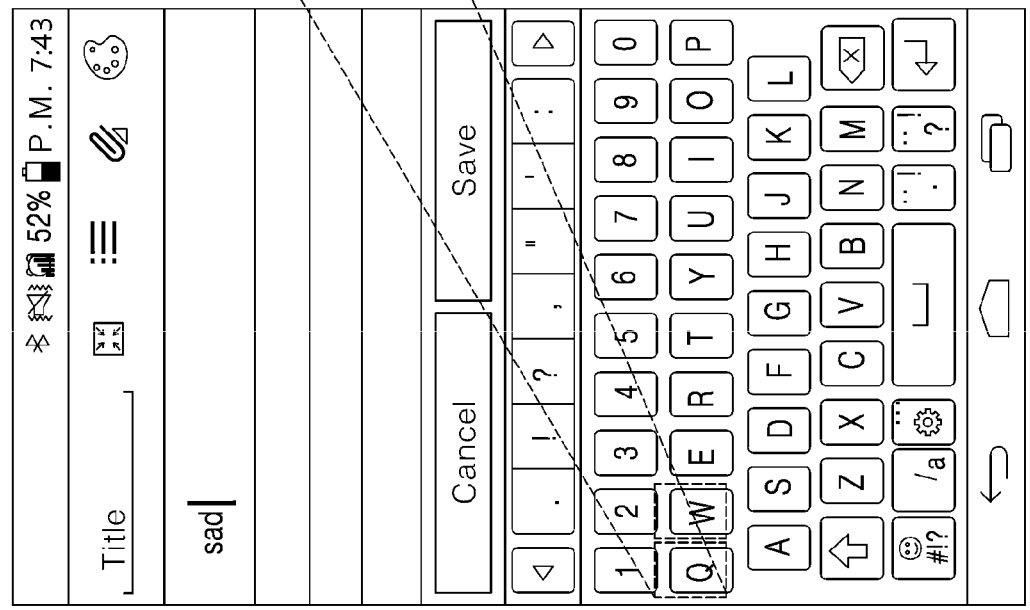
FIG. 9 is a drawing for illustrating a screen configuration where touch keyboard is displayed for describing an operation of calibrating an object based on correcting information according to an exemplary of embodiment.
Figure 9:
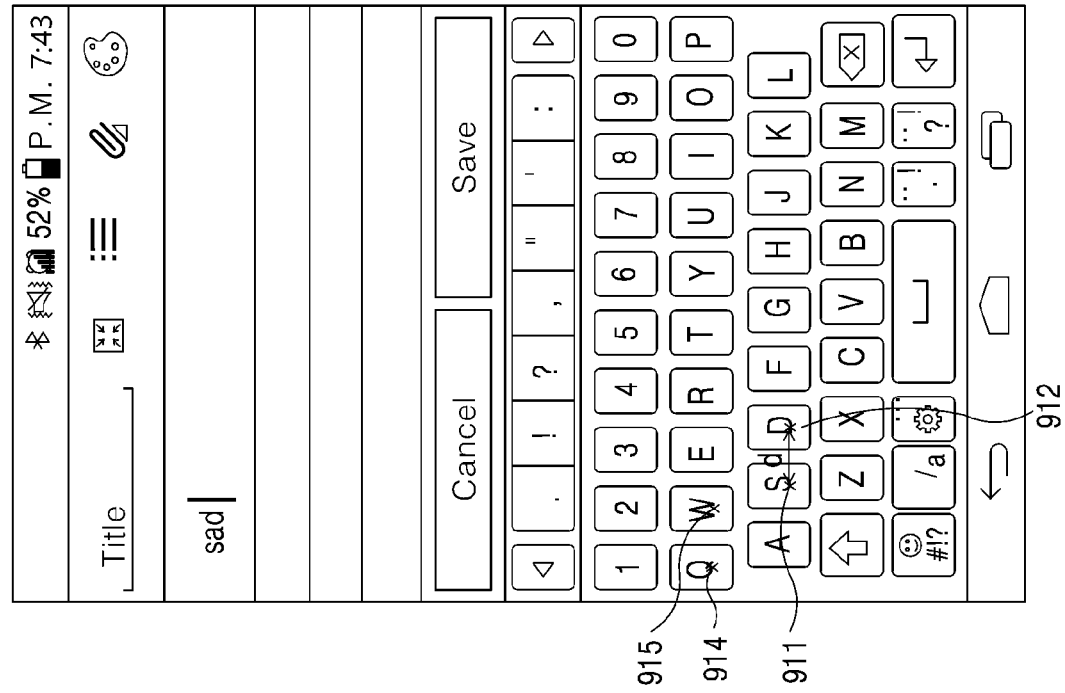

FIG. 8 is a flow chart for illustrating an operation of automatically calibrating an erroneously touched object to a target object that user intended to input based on correcting information generated through learning according to an exemplary of embodiment, and FIG. 9 is a drawing for illustrating a screen configuration where touch keyboard is displayed for describing an operation of calibrating an object based on correcting information according to an exemplary of embodiment.

In FIG. 8, each of operations 810 to 820 may be performed by the calibrating unit 340 described in FIG. 3. FIG. 8 describes an example in which display information (e.g., key button) corresponding to each of the plurality of objects placed in two-dimensional array on the virtual touch keyboard has a size of 1 cm×1 cm in width x height as an example. Here, 1 cm corresponds to an example, and the size of display information corresponding to each of the plurality of objects may be bigger or smaller than 1 cm according to the size of screen where the virtual touch keyboard is displayed and the width and height lengths may be different. Also, according to the characteristics of the objects, the size of the display information may be different. For example, display information of object indicating enter or space, which is often used, may be bigger than display information of the rest of the objects.

Referring to operation 810, the calibrating unit 340 may calculate the distance between location information of adjacent objects input instead of a deleted object and the location information of the deleted object, which are stored in the database.

For example, referring to FIG. 9, although it is intended to input 'dad', when 'd' is input after performing three times of deletion because 'sad' is input, the calibrating unit 340 may calculate distance d (e.g., 3.8−2.8=1 cm) between recognized location information 912 (e.g., column 4, row 3.8) by touching 'd' and recognized location information 911 (e.g., column 4, row 2.8) by touching the first 's' when inputting the 'sad' referring to the database. Also, the calibrating unit 340 may generate correcting information based on a predetermined setting rate and the distance. For example, the setting rate may be preset within a range from 1% to 100%, and when it is set as 50%, the correcting information may be generated as 0.5 cm. Here, the correcting information may be periodically updated through learning. For example, after a touch input occurs, and whenever an erroneously touched object is recognized, the distance may be consistently calculated, and stored several times repeatedly. Then, the correcting information may be updated with an average value of the stored several times repeatedly distance.

Here, the correcting information may be generated for each of objects and for each of sections where objects are included, and one correcting information may be generated for all objects placed on the touch keyboard. In other words, the generated correcting information 0.5 cm may be applied to calibrate all objects, and calibration may be performed based on correcting information corresponding to each of specific objects. For example, the correcting information may be generated for each of all objects through learning such as for the recognized object 's', the correcting information of 0.5 cm may be generated, and for the recognized object 'd', the correcting information of 0.1 cm may be generated. Besides, the same correcting information may be generated for group unit by grouping objects for each of sections through learning. Here, operation generating correcting information for each of sections will be described hereafter referring to FIG. 10.

In operation 820, when new object is input, the calibrating unit 340 may automatically calibrate the new object based on the correcting information generated based on the calculated distance.

In operation 821, the calibrating unit 340 may automatically perform calibration by correcting to move location information of the new object based on the generated correcting information.

For example, referring to FIG. 9, the calibrating unit 340 may add up the correcting value (0.5 cm) corresponding to correcting information for location information 914 ('q') (e.g., column 3, row 1.8) of a new object input through the touch interface, and may calibrate to move the location information 914 of the new object to the location information 915 ('w') corresponding to the result of adding up. Also, the calibrating unit 340 may automatically calibrate the recognized new object from 'q' to 'w' based on the location information 915 corresponding to the result of adding up. Similarly, when the location information 911 is calculated with center of gravity value again and 's' is recognized as new object, the calibrating unit 340 may add correcting value (0.5 cm) corresponding to correcting information to the location information 911, and may calibrate to move the location information 911 to the location information 912. In addition, the calibrating unit 340 may control the object 'd' where the movement corrected location information 912 is included to be displayed on a screen 910. In other words, although a user actually touches part corresponding to the location information 911, the object 's' may be automatically calibrated to 'd' by understanding that the object the user intended to input in the system based on the generated correcting information and on learning. Here, as calibration is automatically performed, the object 'd' may be displayed on the screen 910 without displaying the erroneously touched object 's'.

In operation 822, the calibrating unit 340 may perform calibration by overall reducing in stages the size of sensing area (i.e., key input position) based on a center axis according to predetermined base rate value. Here, the reduction may be performed within a range that it is not recognized as degradation of touch sensitivity of a user. In other words, size reduction may be performed within a range that the user does not recognize as touch sensitivity being degraded.

For example, sensing area may be preset to sense touch input occurring for objects placed on the touch keyboard. For example, a sensing area 921 may be set as a predetermined rate value bigger than display information indicating specific object or set as the size of the corresponding display information. Here, a target object that the user intended to input is incorrectly recognized as an adjacent object because the sensing area for recognizing the touch of the target object (e.g., q) and the adjacent object (e.g., w) is close. Accordingly, the size of sensing area 922 may be reduced according to a predetermined base rate value based on a center axis 921 (or a center point) for each of objects (i.e., the size of the sensing area may be reduced from 922 to 923). Also, the calibrating unit 340 may move the size reduced sensing area 926 based on the matched and stored location information. Here, the calibrating unit 340 may move the size reduced sensing area 926 by moving location of the center axis from 921 to 925.

In other words, it may be understood that actually the right bottom area is touched, not the center area of the target object, when the user touches an object which is intended to input through learning based on the matched and stored location information. Then, objects placed on the touch keyboard may be displayed on the screen 920 as the same and the system reduces the size of the sensing area 923 when a user touches a specific object of the screen. For example, when touching a specific object, the size of the sensing area 923 may be calibrated to move by reducing 923 the size of the sensing area 922 where the touched object is recognized in the system within a range that it does not disturb to sensing area of adjacent object and moving the center axis 921. Accordingly, even though an object that the user intended to input is 'q' afterward, it may be calibrated to recognize 'q' despite erroneously touching by the user because the sensing area 926 of location information 927 corresponds to the object 'q' although the recognized location information corresponds to 927. Here, exemplary embodiments are not limited to thereof. Accordingly, another exemplary embodiment of calibration for erroneously touched object may be performed by calibrating to move sensing area while maintaining the size of sensing area without reducing calibration of the size.

Likewise, touch input convenience may be increased by generating correcting information in the system by understanding the touch habit of the user through learning, automatically performing calibration by understanding an object that the user intended to input in the system based on the generated correcting information, and displaying the calibrated object on the screen, because the system does not need to repeat deletion several times until the desired object is displayed. In other words, preference for and consumer interest in products having the corresponding touch keyboard may be increased by increasing touch sensitivity.

Figure 10:
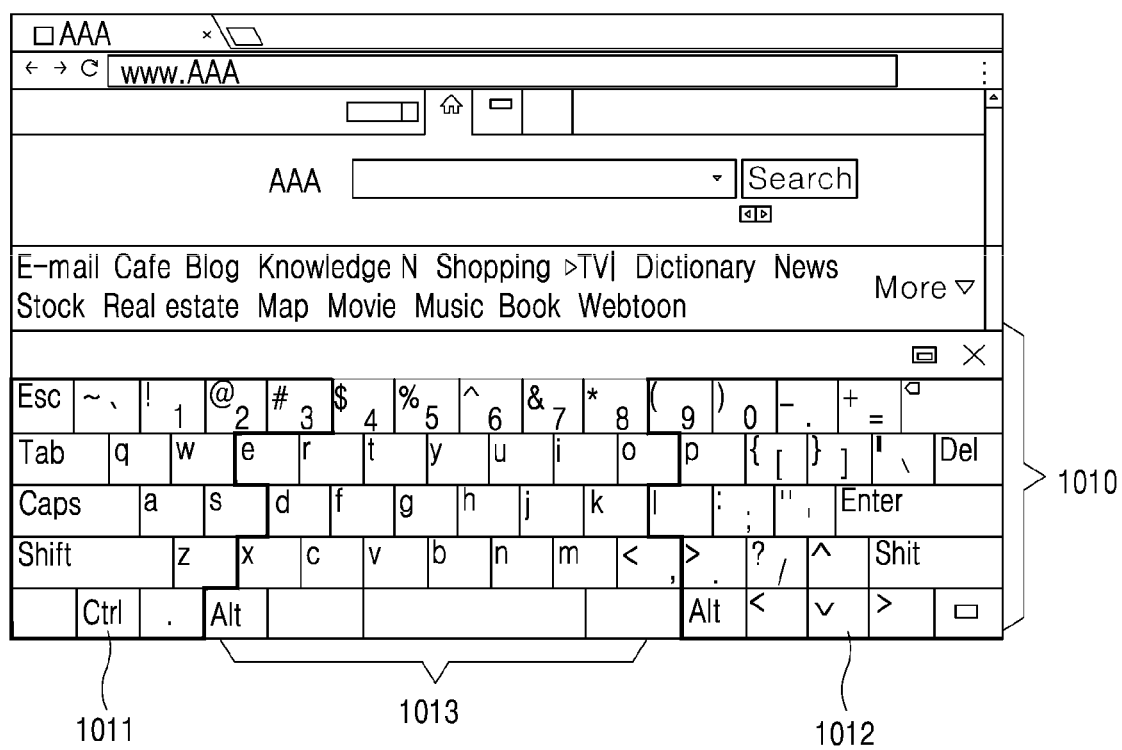
FIG. 10 is a drawing for illustrating a screen configuration where a touch keyboard is displayed for describing an operation of generating correcting information for each of sections according to an exemplary of embodiment.

FIG. 10 is a drawing for illustrating a screen configuration where a touch keyboard is displayed for describing an operation of generating correcting information for each of sections according to an exemplary of embodiment.

Correcting information for calibrating to a target object that a user intended to input through location calibrating of erroneously touched object may be generated as one correcting information for all objects placed on the touch keyboard as described in FIG. 8, and correcting information may be generated for each of the objects (i.e., correcting information may be generated as many as the number of objects). Also, the same correcting information may be generated for group unit by grouping objects for each of sections through learning.

In FIG. 10, an operation generating correcting information for each of sections will be described.

For example, when an erroneous touch relating to objects placed on edge of the touch keyboard occurs above a predetermined number of times and the erroneous touch relating to objects placed on a predetermined center area on the touch keyboard rarely occurs through learning (i.e., when touch accuracy is higher than a predefined baseline accuracy), all objects placed on the touch keyboard may be divided into objects included in the edge section(s) and objects included in the center section. For example, all objects placed on a touch keyboard 1010 may be divided into objects corresponding to edge sections 1011, 1012 and objects corresponding to center section 1013.

For example, when it is understood that erroneous touch occurrence frequency is high for the objects placed on the edge sections 1011, 1012 and erroneous touch occurrence frequency is low for the object placed on the center section 1013 (i.e., touch accuracy is high), the calibrating unit 340 may generate correcting information (e.g., 0.5 cm and the like) for the corresponding section (i.e., edge sections) based on calculated distance and setting rate based on matched and stored location information relating to the objects placed on the edge sections 1011, 1012. Then, the generated information may be matched with identifier information of corresponding section and stored. Here, identifier information of corresponding section and identifier information indicating objects included in corresponding section may be matched, and stored and maintained in database.

Also, calibrating unit 340 may generate correcting information (e.g., 0.01 cm, 0.1 cm, and the like) of a corresponding section (i.e., center section) based on calculated distance and setting rate based on connected and stored location information relating to objects placed on the center section 1013. Then, the generated correcting information may be matched with identifier information of corresponding section and stored, and the identifier information of corresponding section and identifier information indicating objects included in corresponding section may be matched, and stored and maintained in database.

Likewise, when a new object input through a touch interface is recognized after generating correcting information, the calibrating unit 340 may confirm the section where the new object is included based on identifier information of the recognized new object. Also, the calibrating unit 340 may calibrate the new object to the object that the user intended to input by calibrating to move location information of the new object based on correcting information matched with identifier information of confirmed section.

Likewise, besides dividing into edge and center section, areas corresponding to the touch keyboard may be divided in other manners, such as left top edge section, right top edge section, left bottom edge section, right bottom edge section, center section, and the like, and objects corresponding to each of sections may be divided. Then, correcting information for each of sections may be generated based stored several times repeatedly location information for each of sections.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

According to exemplary embodiments of the invention, when touch input for selecting an object is generated by using a touch keyboard, convenience of the User Interface (UI) and the User Experience (UX) may be improved to reduce inconvenience when a user consistently touches a specific (erroneous) object until an object intended by a user to be touched (target object) actually is recognized in a system by automatically calibrating touch recognition error such that the system recognizes the target object instead of the actual object erroneously touched.

Also, according to exemplary embodiments of the invention, an optimized calibration for different users of the same device may be performed by collecting information for touching different locations (i.e., points) relating to the same specific object (letter, number, mark, and the like) according to shape and size of finger of an each user and re-reflecting correct calibration through learning based on the collected information.

Also, touch sensitivity may be improved according to the principles and exemplary embodiments of the invention by calibrating touch error more precisely by dividing operations into right-handed touch or left-handed touch, and/or diving each of sections of touch keyboard into sub-sections (e.g., center section, edge section, and the like).

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A system for calibrating touch error in a touch keyboard, the system comprising:
   a touch key recognizing unit to recognize at least one first touch key input through the touch keyboard having a plurality of touch keys;
   a target touch key determining unit to determine whether the first touch key corresponds to a target touch key by determining that the first touch key does not correspond to the target touch key when an input by the first touch key is deleted by using a deletion function touch key within a predetermined time period and an adjacent touch key is input instead of the deleted input;
   a storing control unit to match and store location information corresponding to the first touch key and at least one location information corresponding to the target touch key; and
   a calibrating unit to calibrate the recognized first touch key input through the touch keyboard to the target touch key based on the matched and stored location information.

2. The system of claim 1, wherein the target touch key determining unit determines the adjacent touch key is the target touch key.

3. The system of claim 1, wherein the target touch key determining unit determines that the first touch key corresponds to the target touch key when the input by the first touch key is not deleted for a predetermined time period.

4. The system of claim 1, wherein the calibrating unit calculates a distance between location information corresponding to the adjacent touch key and location information corresponding to the first touch key when the input by the first touch key is deleted, and calibrates the first touch key to the target touch key based on the calculated distance.

5. The system of claim 1, wherein the calibrating unit corrects to move location information corresponding to the first touch key based on the matched and stored location information when the first touch key does not correspond to the target touch key.

6. The system of claim 5, wherein the storing control unit controls location information corresponding to the adjacent touch key input after the input by the first touch key is deleted and location information corresponding to the first touch key to be matched and stored, when the first touch key does not correspond to the target touch key.

7. The system of claim 1, wherein the touch key recognizing unit determines touch direction corresponding to the first touch key input through the touch keyboard from right-handed touch and left-handed touch based on a specific voltage value corresponding to a touch area when the first touch key is input.

8. The system of claim 7, wherein the storing control unit controls location information corresponding to the first touch key and at least one location information corresponding to the target touch key to be matched and stored according to the determined touch direction.

9. The system of claim 8, wherein the calibrating unit divides the plurality of touch keys placed on the touch keyboard by sections according to location on the touch keyboard, generates correcting information for each of the sections based on the matched and stored location information, and calibrates the first touch key to the target touch key based on correcting information corresponding to a section in which the first touch key is included.

10. A method of calibrating touch error in a touch keyboard, the method comprising the steps of:
    recognizing at least one first touch key input through the touch keyboard having a plurality of touch keys;
    determining whether the first touch key corresponds to a target touch key by determining that the first touch key does not correspond to the target touch key when an input by the first touch key is deleted by using a deletion function touch key within predetermined time period and an adjacent touch key is input instead of the deleted input;
    matching and storing location information corresponding to the first touch key and at least one location information corresponding to the target touch key; and
    calibrating the first touch key input through the touch keyboard to the target touch key based on the matched and stored location information.

11. The method of claim 10, wherein the step of determining whether the first touch key corresponds to the target touch key comprises:
    determining the adjacent touch key is the target touch key.

12. The method of claim 10, wherein the step of determining whether the first touch key corresponds to a target touch key further comprises determining that the first touch key corresponds to the target touch key when the first touch key is not deleted for predetermined time period.

13. The method of claim 10, wherein the step of calibrating the recognized object to the target object comprises:
    calculating a distance between location information corresponding to the adjacent touch key and location information corresponding to the deleted first touch key; and
    calibrating the first touch key to the target touch key based on the calculated distance.

14. The method of claim 10, wherein the step of calibrating the first touch key to the target touch key comprises:
    correcting to move location information corresponding to the first touch key based on the matched and stored location information when the first touch key does not correspond to the target touch key.

15. The method of claim 14, wherein the step of matching and storing location information comprises matching and storing location information corresponding to the adjacent touch key input after the first touch key is deleted and location information corresponding to the first touch key when the first touch key does not correspond to the target touch key.

16. The method of claim 10, wherein the step of recognizing at least one first touch key comprises determining touch direction corresponding to the first touch key input through the touch keyboard from right-handed touch and left-handed touch based on a specific voltage value corresponding to a touch area when the first touch key is input.

17. The method of claim 16, wherein the step of matching and storing location information comprises matching and storing location information corresponding to the first touch key and at least one location information corresponding to the target touch key according to the determined touch direction.

18. The method of claim 10, wherein the step of calibrating the first touch key to the target touch key comprises:
    dividing the plurality of touch keys into sections according to their location on the touch keyboard;
    generating correcting information for at least some of the sections based on the matched and stored location information; and calibrating the first touch key to the target touch key based on the correcting information corresponding to a section in which the first touch key is included.

19. A non-transitory computer-readable media to execute a method for calibrating touch error in a touch keyboard combined with an electronic device implemented by a processor, wherein the method for calibrating touch error comprises:

recognizing at least one first touch key input through the touch keyboard having a plurality of touch keys;

determining whether the first touch key corresponds to a target touch key by determining that the first touch key does not correspond to the target touch key when an input by the first touch key is deleted by using a deletion function touch key within a predetermined time period and an adjacent touch key is input instead of the deleted input;

matching and storing location information corresponding to the first touch key and at least one location information corresponding to the target touch key; and calibrating the first touch key input through the touch keyboard to the target touch key based on the matched and stored location information.

20. The non-transitory computer-readable media of claim 19, wherein determining whether the first touch key corresponds to the target touch key comprises:

determining the adjacent touch key is the target touch key.

* * * * *